May 12, 1936.  E. J. O. MAGNE  2,040,210
SOWING MACHINE
Filed Feb. 23, 1934
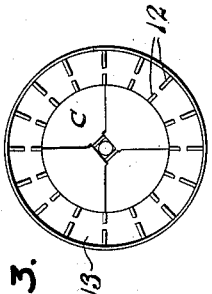
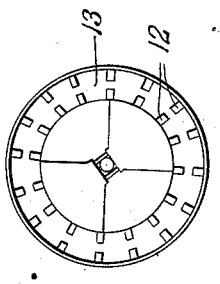
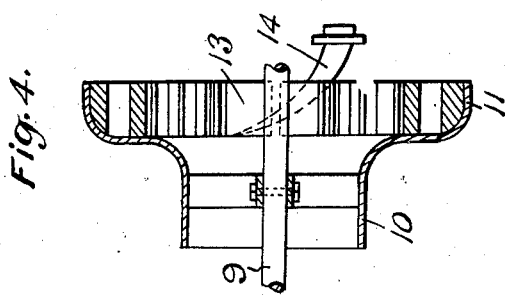

Patented May 12, 1936

2,040,210

UNITED STATES PATENT OFFICE 2,040,210

SOWING MACHINE

Ernst Johan Oscar Magne, Visby, Sweden

Application February 23, 1934, Serial No. 712,649
In Sweden March 13, 1933

2 Claims. (Cl. 111—77)

The present invention relates to a sowing machine adapted to be drawn on wheels and intended for instance for potatoes or seeds, and in which the potatoes and the seeds respectively are automatically supplied from a receptacle, when the machine is being drawn.

The invention is illustrated in the accompanying drawing, in which Figure 1 is a diagrammatical vertical section of a sowing machine for potatoes in accordance with the invention.

Figure 2 is an enlarged detail view of a supplying drum adapted for small potatoes and Figure 3 is a detail view of a corresponding supplying drum for large potatoes.

Fig. 4 is a longitudinal sectional view of the drum.

Referring to the drawing numeral 1 indicates a frame provided with a beam 2, and supported by two wheels 3 on an axle 4. The frame 1 supports a tapering hopper 5, the bottom of which is provided with an outlet opening 6 directed obliquely forward. A rotatable shaft 9 is mounted in the rearwardly slanting front wall 7 of the receptacle 5 and in a member 8, which is secured to the shaft 2, said shaft 9 slanting at an angle of about 45° relatively to the horizontal plane. A drum 10 open at both ends is secured to the said shaft 9 and at the end facing the front wall 7 provided with a bowl-shaped extension 11. Along its circumference the inside of the bowl-shaped extension 11 is provided with radial partition walls 12 which extend towards the center to provide separate cells 13 each cell being about the size adapted to receive a potato. These cells 13 are open at their inner ends. The partition walls 12 are further each divided at substantially the center to form a gap, the several gaps being arranged in the form of a circle.

A finger or projection 14 is attached at its inner end or front wall of the receptacle 5. This finger or projection 14 extends into the gaps between the portions of the broken walls 12 and which slants relatively to the bottom plane of the bowl-shaped portion, so that it is able to extend below the potatoes in the cells and lift them. Around the lower portion 15 of the drum 10 there is a driving belt 16, which also is laid around a belt pulley 18 having a conical toothed wheel 17 and being freely mounted on a shaft 19 in such a manner that the conical toothed wheel 17 meshes with a conical toothed wheel 20 provided on the axle 4 and rotating with the wheels of the machine, the shaft 19 being supported by the axle 4 and the member 8.

If desired a pipe 24 may be attached in any convenient manner to the frame 1 to facilitate the guidance of the potatoes as they leave the drum 10 to a desired point rearwardly of the ploughshare 21.

A cover 23 may also be arranged over the top of the drum 10 to prevent the potatoes from shaking out. This cover 23 is attached to the frame 1 in any manner desired and does not partake in the rotation of the bowl.

In front of the lower end 15 of the drum 10 and at the ground the machine preferably is provided with a ploughshare 21 to furrow the ground for the potatoes and behind the drum 10, also at the ground, the machine is provided with one or two shovels 22 for subsequently filling up the furrow.

The device operates as follows: Potatoes placed in the receptacle 5 leave successively through the opening 6 and fall into those cells 13 of the bowl-shaped portion 11 of the drum 10, which are furthest down at that time. When the machine is being drawn the wheels 3 rotate the drum 10 by means of the conical toothed wheels 17 and 20 and the driving belt 16, so that the cells 13 filled with potatoes will move to the highest portion of the bowl-shaped portion 11, where the finger 14 enters between the two portions of the walls 12 and forces out the potato in question, so that it will fall down through the lower open end of the drum 10 into the furrow in the ground below made by the ploughshare 21.

Having now described my invention, what I claim as new and desire to secure by Letters Patent is:

1. A sowing-machine for seeds and potatoes having a receptacle open at its lower end, a drum provided in front of the said receptacle, said drum being open at both ends and adapted to rotate about a shaft slanting at an angle of about 45° relatively to the horizontal plane, the upper portion of the said drum being provided with a bowl-shaped extension with radial walls extending some way toward the center and dividing the circumference of the bowl-shaped portion into sections or cells, the drum, by way of a driving belt, being driven by wheels supporting the sowing-machine, characterized by the fact that the radial walls are broken, and that a finger is secured to the front wall of the receptacle, said finger extending into the interspace between the two portions of the broken walls and slanting relatively to the bottom plane of the bowl-shaped portion.

2. A sowing-machine for seeds and potatoes having a receptacle open at its lower end, a drum provided in front of the said receptacle, said drum being open at both ends and adapted to rotate about a shaft slanting at an angle of about 45° relatively to the horizontal plane, the upper portion of the said drum being provided with a bowl-shaped extension with radial walls extending some way toward the center and dividing the circumference of the bowl-shaped portion into sections or cells, the drum, by way of a driving belt, being driven by wheels supporting the sowing-machine, characterized by the fact that the radial walls are broken, and that a finger is secured to the front wall of the receptacle, said finger extending into the interspace between the two portions of the broken walls and slanting relatively to the bottom plane of the bowl-shaped portion and further characterized by the fact that part of the bowl-shaped portion is covered by a covering member so as to prevent the seeds or potatoes from being shaken out of the cells.

ERNST JOHAN OSCAR MAGNE.